United States Patent Office 3,086,921
Patented Apr. 23, 1963

3,086,921
MALTING PROCESS
John G. Fleckenstein, Brookfield, Wis., assignor to Kurth Malting Company, Milwaukee, Wis., a corporation of Wisconsin
No Drawing. Filed Sept. 12, 1961, Ser. No. 137,525
15 Claims. (Cl. 195—70)

This invention relates to the production of malt. More particularly, this invention is concerned with a novel method of producing malt in which enzyme production, especially the alpha-amylase content, is stimulated and the modification of the malt is increased.

Many compounds have been found to effect cereal seed germination and modification. Some of them stimulate, while others retard growth and modification of the resulting malt. One stimulatory material in common use is gibberellic acid which stimulates growth and enzymatic development of the germinating cereal grain. This enhancement of growth and enzymatic development is important to the maltster, since these malts are preferred for some uses over malts that are prepared without added gibberellic acid. Gibberellic acid though is an expensive product isolated from the metabolic products of certain mold species. To be entirely suitable cheaper, and more readily obtainable, compounds which give the desired results are needed.

It has been found, according to the present invention, that certain O-phenyl phosphates and O-phenyl phosphorothioates act during the germination of a grain being malted to increase the enzymatic potential and modification of the resulting malt.

The O-phenyl phosphates and O-phenyl phosphorothioates which have been found to have this ability may be represented by the formulas

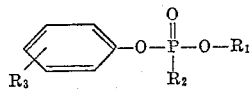

and

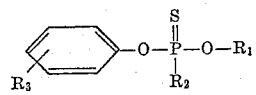

wherein $R_1$ is a member of the group consisting of lower alkyls such as methyl, ethyl, propyl and isopropyl and aralkyl groups such as phenyl-lower alkyl groups including benzyl and phenethyl, $R_2$ is a member of the group consisting of lower alkoxy groups such as methoxy, ethoxy and propoxy, aryl-alkoxy groups such as phenyl-lower alkoxy groups including benzyloxy and phenylethoxy, and groups in which $R_2$ represents amine groups of the formula

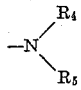

wherein $R_4$ and $R_5$ are the same or different groups including hydrogen, alkyls such as methyl, ethyl, propyl, isopropyl and octyl, phenyl-alkyl groups such as benzyl and phenethyl, and $R_3$ represents from 1 to 5, and advisably 1 to 3, nuclear substituents on the phenyl group taken from the group consisting of hydrogen, hydroxy, halogens and particularly chlorine and bromine, lower alkyl groups such as methyl and ethyl, lower alkoxy groups such as methoxy and ethoxy and nitro.

Of the described compounds, those which appear to increase the enzymatic potential and modification of the malt most are those of the formulas

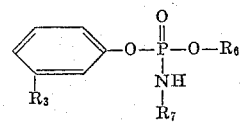

and

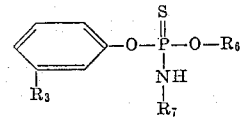

in which $R_3$ has the assigned meaning, $R_6$ is a lower alkyl and particularly is methyl and $R_7$ is hydrogen or a lower alkyl such as methyl and isopropyl. Furthermore, of the groups represented by $R_3$, the evidence indicates that halogens and particularly chlorine in the 2,4 and 3,4-positions of the phenyl ring have the greatest activity.

The compounds with which this invention is concerned are shown in the prior art, as for example, United States Patent No. 2,552,574.

Some specific O-phenyl phosphates and O-phenyl phosphorothioates which can be used in practicing the invention are:

O-(4-chlorophenyl)-O-methyl phosphoramidothioate,
O-(3,4-dichlorophenyl)-O-methyl isopropylphosphoramidothioate,
O,O-dimethyl-O-(2,4-dichlorophenyl)-phosphorothioate,
O-(2,4-dichlorophenyl)-O-methyl phosphoramidothioate,
O-(2,4,5-trichlorophenyl)-O-methyl dimethylphosphoramidothioate,
O-(2,4,5-trichlorophenyl)-O-isopropyl octylphosphoramidothioate,
O-(2-chloro-4-tert-butylphenyl)-O-methyl methylphosphoramidoate,
O-(2,4-dichlorophenyl)-O,O-dimethyl phosphate,
O-(2,4-dichlorophenyl)-O-methyl ethylphosphoramidoate,
O-(2,4-dichlorophenyl)-O-butyl isopropylphosphoramidoate,
O-(2,4,5-trichlorophenyl)-O-methyl phosphoramidoate,
O-(2,4,5-trichlorophenyl)-O-methyl dimethylphosphoramidoate,
O-(2,4,5-trichlorophenyl)-O-methyl octylphosphoramidoate and
O-(3-nitrophenyl)-O-benzyl benzylphosphoramidothioate.

The O-phenyl phosphates and O-phenyl phosphorothioates have been found to selectively stimulate the formation of alpha-amylase and the breakdown of the starch matrix, or modification, of the endosperm during the germination process. They do not appear to have any effect on other physical or chemical properties of the resultant malt.

In order to effect the desired enzyme stimulation, one or more of these compounds is applied to the cereal grain during the malting process and advisably in the period from steep out to prior to passage of more than 50% of the germination time. Usually, however, the best results are obtained by applying the compounds to the grain in the period from steep out to the end of the first day of germination. It is believed feasible, nevertheless, to include the compounds in the steep water during the last day or so of steeping.

Very small amounts of the compounds are required, with as little as 1 part per million by weight and usually no more than 500 parts per million, based on the weight of cereal grain put to steep, being suitable for most of the compounds. Concentrataion levels of 5 to 200 parts per million are suitable for most compounds although amounts of from 25 to 75 parts per million of the compounds would normally be used to assure obtaining the enzymatic increase and avoiding possible adverse effects. It is to be understood that variation in activities of the compounds exists, and, therefore, the optimum amount for any specific compound can be determined by simple screening tests.

These compounds are usually applied to the cereal grain after steeping by dispersing them in a suitable carrier to obtain a more satisfactory volume to dosage ratio.

Some of the compounds are water insoluble oils, and others are water insoluble solids. However, they are soluble in the common organic solvents such as acetone, alcohol, benzene, or hexane. The solution resulting can then be diluted with water using a suitable dispersing or emulsifying agent as necessary to maintain dispersion of the compound in the liquid. Spraying or sprinkling can then be used to apply the dispersion to the grain.

The practice of this invention does not require changes in the other steps of the malting process. Conventional steeping, germination and kilning schedules can be used. The malt recoveries are about the same or slightly higher than those obtained without the use of the phosphates.

This invention is useful in the malting of cereal grains, in addition to barley, including wheat, rice, oats and rye.

The following example illustrates the practice of this invention.

EXAMPLE 1

350 grams of Kindred barley was weighed into a one-gallon bottle and steeped at 55° F. with appropriate water changes. Water was added to the steeped barley to bring the moisture pickup to 200 gm. The compound being tested was dissolved in 5 ml. of acetone and the solution added to the steeped barley. The barley was germinated for five days at 63–65° F. under controlled conditions of agitation, ventilation and humidity.

After germination the green malts were kilned 12 hours at 120° F., 4 hours at 140° F., 6 hours at 160° F. and 2 hours at 180° F.

The alpha-amylase values for the malts were determined according to the method in "Methods of Analysis of the American Society of Brewing Chemists," 6th ed., page 169 (1958), American Society of Brewing Chemists, Madison 5, Wisconsin.

The modification index of each sample was determined. It is a measure of the conversion of the barley, or other grain, to malt. The higher the value, the greater is the conversion into malt. The modification index determination provides similar information as is furnished by the wort viscosity and coarse-fine difference determinations.

$$\text{Modification index} = 100 \times \frac{1}{\text{TCA viscosity}}$$

Trichloroacetic acid viscosity is determined as follows:

A 25 gm. sample of malt is finely ground (Miag Cone Mill, setting 95). A flask is heated to approximately 68° C., 25 mls. of 40% trichloroacetic acid added and then 200 mls. of hot tap water. The mixture is cooled to 68° C., the 25 gm. of malt added and the mixture blended 2 minutes and filtered.

A viscosimeter is cooled to 20° C. and a 10 ml. sample of the malt dispersion is added. After cooling to 20° C. the running time is recorded. This is then repeated.

The water time of the viscosimeter is measured by adding 10 ml. of distilled water to a clean, drained viscosimeter and the running time measured at 20° C.

The viscosity is then calculated as follows:

$$\text{TCA viscosity} = \frac{\text{Running time of malt solution}}{\text{Running time of water}}$$

Control samples were also run and alpha-amylase values of 40–45 obtained while the modification index values for the controls were from 25 to 30.

The compounds tested and the results obtained are reported in Tables 1 and 2. The values are reported as increases over the values obtained for the controls run simultaneously.

*Table 1*

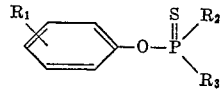

| No. | $R_1$ | $R_2$ | $R_3$ | Alpha-Amylase Increase/Modification Index Increase, Treatment Level, p.p.m. | | | | | |
|---|---|---|---|---|---|---|---|---|---|
| | | | | 1 | 5 | 10 | 25 | 50 | 500 |
| 1 | 4-chloro | —OCH$_3$ | —NH$_2$ | 5/14 | 7/25 | | | 10/28 | —25/18 |
| 2 | 4-chloro | —OCH$_3$ | —NHCH(CH$_3$)$_2$ | 1/12 | 2/21 | | | 14/30 | 2/28 |
| 3 | 3,4-dichloro | —OCH$_3$ | —NHCH(CH$_3$)$_2$ | | 6/18 | | | 11/24 | 2/31 |
| 4 | 2,4-dichloro | —OCH$_3$ | —OCH$_3$ | | 6/15 | 10/26 | 6/27 | 8/17 | —6/20 |
| 5 | 2,4-dichloro | —OCH$_3$ | —NH$_2$ | 6/17 | 16/25 | 17/29 | 16/29 | 21/30 | —7/25 |
| 6 | 2,4-dichloro | —OCH$_3$ | —NHC$_2$H$_5$ | | 6/17 | | | 14/19 | 5/22 |
| 7 | 2,4-dichloro | —OCH$_3$ | —NHCH(CH$_3$)$_2$ | 5/4 | 7/17 | 7/19 | 11/29 | 16/25 | 9/25 |
| 8 | 2,4-dichloro | —OCH(CH$_3$)$_2$ | —NH$_2$ | | 2/6 | | | 8/16 | —15/20 |
| 9 | 2,4-dichloro | —OCH(CH$_3$)$_2$ | —NHCH(CH$_3$)$_2$ | | —/—1 | | | —/1 | —2/10 |
| 10 | 2,4-dichloro | —OCH$_2$CH$_2$CH$_2$CH$_3$ | —NHCH(CH$_3$)$_2$ | | —/— | | | 4/1 | 6/26 |
| 11 | 2,4,5-trichloro | —OCH$_3$ | —OCH$_3$ | | 7/18 | | | 9/22 | 4/26 |
| 12 | 2,4,5-trichloro | —OCH$_3$ | —NH$_2$ | | 10/18 | | | 13/24 | 7/24 |
| 13 | 2,4,5-trichloro | —OCH$_3$ | —N(CH$_3$)$_2$ | | 1/4 | | | 7/16 | 6/24 |
| 14 | 2,4,5-trichloro | —OCH$_3$ | —NHCH(CH$_3$)$_2$ | | 5/6 | | | 6/18 | —/14 |
| 15 | 2,4,5-trichloro | —OCH$_3$ | —NH(CH$_2$)$_7$CH$_3$ | | 4/6 | | | 4/20 | 5/25 |
| 16 | 2,4,5-trichloro | —OCH(CH$_3$)$_2$ | —NHCH(CH$_3$)$_2$ | | —3/—1 | | | —/4 | 5/23 |

Table 2

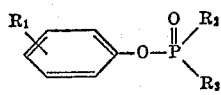

| No. | $R_1$ | $R_2$ | $R_3$ | Alpha-Amylase Increase/Modification Index Increase, Treatment Level, p.p.m. | | | | | |
|---|---|---|---|---|---|---|---|---|---|
| | | | | 1 | 5 | 10 | 25 | 50 | 500 |
| 17 | 4-tert-butyl-2-chloro | —OCH$_3$ | —NHCH$_3$ | | —/22 | | | 1/31 | 9/28 |
| 18 | 2,4-dichloro | —OCH$_3$ | —OCH$_3$ | | 7/18 | 8/26 | 6/26 | 9/22 | —10/17 |
| 19 | 2,4-dichloro | —OCH$_3$ | —NH$_2$ | 4/10 | 15/22 | 19/28 | 21/31 | 29/23 | 11/27 |
| 20 | 2,4-dichloro | —OCH$_3$ | —NHCH(CH$_3$)$_2$ | 6/21 | 20/28 | 21/30 | 21/30 | 32/28 | 6/28 |
| 21 | 2,4,5-trichloro | —OCH$_3$ | —NH$_2$ | | —/2/— | | | —/15 | —9/7 |
| 22 | 2,4,5-trichloro | —OCH$_3$ | —NHCH(CH$_3$)$_2$ | | 4/16 | | | 10/19 | 10/12 |

Various changes and modifications of the invention can be made and, to the extent that such variations incorporate the spirit of this invention, they are intended to be included within the scope of the appended claims.

What is claimed is:

1. The process of malting in which grain is subjected, in the period consisting of the malting steps of steeping and germination of the steeped grain to the action of a compound of the formula

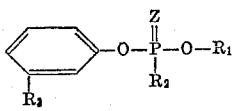

wherein Z is a member of the group consisting of oxygen and sulfur, $R_1$ is a member of the group consisting of lower alkyl and phenyl-lower alkyl, $R_2$ is a member of the group consisting of lower alkoxy, phenyl-lower alkoxy and groups in which $R_2$ represents groups of the formula

wherein $R_4$ and $R_5$ are members of the group consisting of hydrogen, lower alkyl and phenyl-lower alkyl and $R_3$ represents from 1 to 5 nuclear substituents on the phenyl group selected from the group consisting of hydrogen, hydroxy, halogen, lower alkyl, lower alkoxy and nitro.

2. The process of claim 1 in which 1 to 500 parts per million of the compound, based on the weight of grain put to steep, is used.

3. The process of claim 1 in which the grain is barley.

4. The process of increasing the alpha-amylase and modification index values of a malted cereal grain which comprises applying 1 to 500 parts per million, based on the weight of grain put to steep, of a compound of the formula

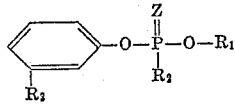

wherein Z is a member of the group consisting of oxygen and sulfur, $R_1$ is a member of the group consisting of lower alkyl and phenyl-lower alkyl, $R_2$ is a member of the group consisting of lower alkoxy, phenyl-lower alkoxy and groups in which $R_2$ represents groups of the formula

wherein $R_4$ and $R_5$ are members of the group consisting of hydrogen, lower alkyl and phenyl-lower alkyl, and $R_3$ represents from 1 to 5 nuclear substituents on the phenyl group selected from the group consisting of hydrogen, hydroxy, halogen, lower alkyl, lower alkoxy and nitro to a steeped cereal grain and then germinating and drying the grain.

5. The process of claim 4 in which the grain is barley.

6. The process of increasing the alpha-amylase and modification index values of a malted cereal grain which comprises applying 1 to 500 parts per million, based on the weight of grain put to steep, of O-(2,4-dichlorophenyl)-O-methyl phosphoramidothioate to a steeped cereal grain and then germinating and drying the grain.

7. The process of increasing the alpha-amylase and modification index values of a malted cereal grain which comprises applying 1 to 500 parts per million, based on the weight of grain put to steep, of O-(3,4-dichlorophenyl)-O-methyl isopropylphosphoramidothioate to a steeped cereal grain and then germinating and drying the grain.

8. The process of increasing the alpha-amylase and modification index values of a malted cereal grain which comprises applying 1 to 500 parts per million, based on the weight of grain put to steep, of O-(2,4-dichlorophenyl)-O,O-dimethyl phosphate to a steeped cereal grain and then germinating and drying the grain.

9. The process of increasing the alpha-amylase and modification index values of a malted cereal grain which comprises applying 1 to 500 parts per million, based on the weight of grain put to steep, of O-(2,4,5-trichlorophenyl)-O-methyl phosphoramidoate to a steeped cereal grain and then germinating and drying the grain.

10. The process of increasing the alpha-amylase and modification index values of a malted cereal grain which comprises applying 1 to 500 parts per million, based on the weight of grain put to steep, of O-(2,4,5-trichlorophenyl)-O-methyl phosphoramidothioate to a steeped cereal grain and then germinating and drying the grain.

11. The process of increasing the alpha-amylase and modification index values of a malted cereal grain which comprises applying 1 to 500 parts per million, based on the weight of grain put to steep, of O-(2,4-dichlorophenyl)-O-methyl phosphoramidoate to a steeped cereal grain and then germinating and drying the grain.

12. The process of increasing the alpha-amylase and modification index values of a malted cereal grain which comprises applying 1 to 500 parts per million, based on the weight of grain put to steep, of O-(2,4-dichlorophenyl)-O-methyl isopropylphosphoramidothioate to a steeped cereal grain and then germinating and drying the grain.

13. The process of increasing the alpha-amylase and modification index values of a malted cereal grain which comprises applying 1 to 500 parts per million, based on the weight of grain put to steep, of O-(4-chlorophenyl)-O-methyl phosphoramidothioate to a steeped cereal grain and then germinating and drying the grain.

14. The process of increasing the alpha-amylase and modification index values of a malted cereal grain which comprises applying 1 to 500 parts per million, based on the weight of grain put to steep, of O-(2,4-dichlorophenyl)-O-methyl ethylphosphoramidoate to a steeped cereal grain and then germinating and drying the grain.

15. The process of increasing the alpha-amylase and modification index values of a malted cereal grain which comprises applying 1 to 500 parts per million, based on the weight of grain put to steep, of O-(2,4-dichlorophenyl) - O - methyl isopropylphosphoramidoate to a steeped cereal grain and then germinating and drying the grain.

References Cited in the file of this patent

UNITED STATES PATENTS 2,698,275 Stoller _____ Dec. 28, 1954

FOREIGN PATENTS 781,599 Great Britain _____ Aug. 21, 1957